April 22, 1941.    B. BORLAND    2,238,966

SEAL

Filed Feb. 4, 1939

INVENTOR.
Bruce Borland
BY Glenn S. Noble
ATTORNEY.

Patented Apr. 22, 1941

2,238,966

UNITED STATES PATENT OFFICE 2,238,966

SEAL

Bruce Borland, Chicago, Ill.

Application February 4, 1939, Serial No. 254,609

3 Claims. (Cl. 40—2.2)

This invention is for seals used for identifying purposes and is particularly intended for seals used for identifying food products such as kosher meats, or the like. Heretofore seals of the ordinary seal type comprising wires with lead buttons have been used for this purpose but the use of lead has been found objectionable and in some cases prohibited. In accordance with the present invention I provide a seal formed entirely of a piece of wire which may be made of any suitable metal for the purposes intended but which is ordinarily of the tinned or tin coated type.

The objects of this invention are to provide an improved seal of the character indicated which will be very economical to manufacture and which will be efficient and satisfactory in use; to provide a seal formed of a single piece of wire having a sealing portion which may be impressed with identifying characters; to provide a wire seal which will readily penetrate the material, such as meat, to be marked, and which cannot be readily opened or unsealed without showing that it has been tampered with; to provide a seal having a coiled wire receptacle for the end of the wire which is shaped to facilitate the insertion of the end and which will limit the distance to which the end may be inserted; and to provide such other advantages and improvements as will appear more fully from the following description.

In the accompanying drawing,

Figure 1 is a perspective view of my seal as applied to a piece of meat or the like;

Figure 1:
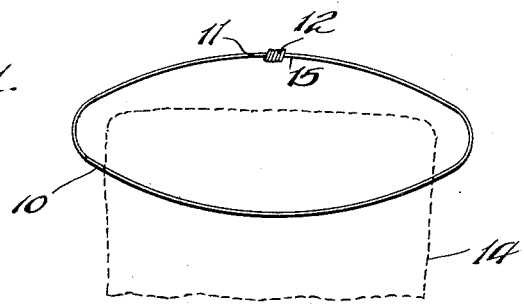
Figure 2:
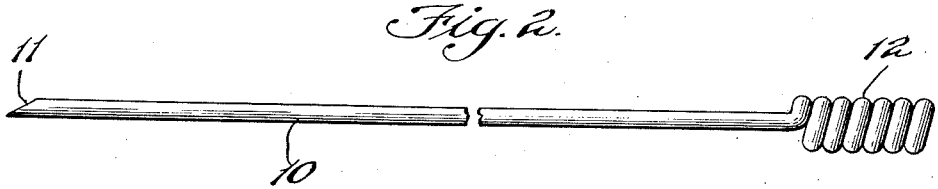
Figure 2 is an enlarged side view.
Figure 3:
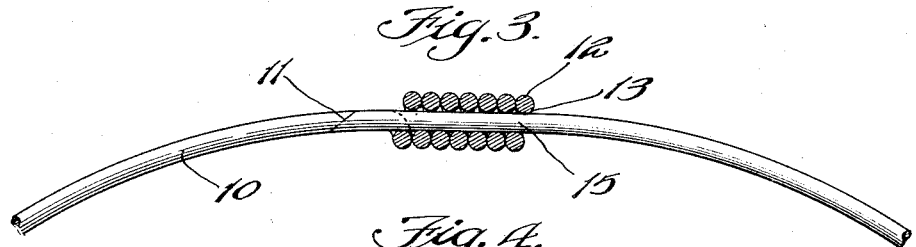
Figure 3 is an enlarged sectional view showing the parts in position to be acted upon by the sealing press.

As shown in the drawing, the seal comprises a wire or shackle 10 formed of any suitable material such as tin or tin coated steel, which will not be readily affected by the material to which the seal is to be applied. The wire may be of any suitable size but for ordinary purposes is approximately one-thirty-secondth of an inch in diameter and one end is sharpened as shown at 11. The other end is formed into a coil 12, the inner diameter or hole 13 therethrough being only slightly larger than the diameter of the wire so that the wire will pass freely therein or therethrough. The coil or winding 12 may be made in the form of a helix as shown in Figures 2 and 3 preferably with the windings closed or tight together.

Figure 4:
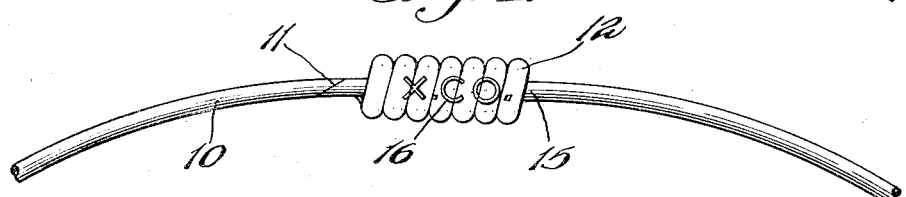
Figure 4 is a side view showing the sealing portion after the press has been applied thereto.
Figure 5:
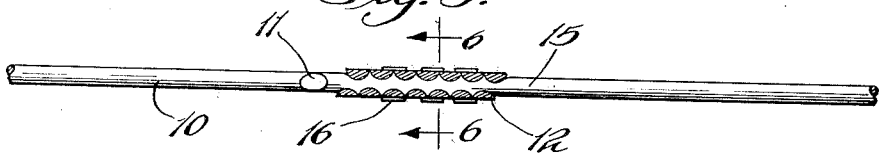
Figure 5 is a sectional view through the sealed portion as shown in Figure 4.

When the seal is to be used, as for marking a piece of meat as indicated at 14, the sharpened end 11 is passed through the article and then inserted in the coil 12 to complete the seal. The coil is then subjected to the action of a sealing press, which flattens the coil as shown in Figures 4 and 5. This pressing action causes the inner surfaces of the coil rings to enter or be forced into the surface of the free end 15 of the wire which is positioned within the helix. This also causes the free end to be flattened or corrugated as indicated in Figures 5 and 6 and the parts are so thoroughly and completely joined that it is practically impossible to disconnect them without breaking the wire or showing that the same has been tampered with.

The coil or helix also provides means for applying identifying characters to the seal. For this purpose the seal press is provided with die letters which may form either raised or depressed letters or characters in one or both sides of the flattened coil, for instance as indicated by the letters "X.CO" as shown in Figure 4, at 16.

Figures 6, 7:
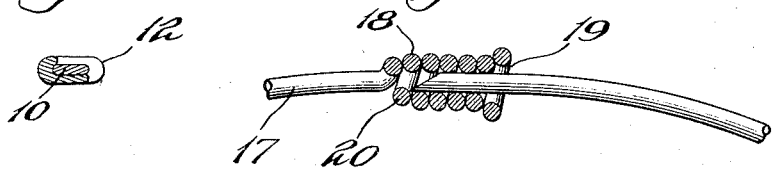
Figure 6 is a cross sectional view taken on the line 6—6 of Figure 5.
Figure 7 is a sectional view showing a modification.

The seal 17 shown in Figure 7 has a coil or seal 18 with its outer end having at least one coil made larger than the others to provide a mouth or conical opening 19 for facilitating the insertion of the end of the wire into the coil. The innermost ring or coil 20 is made smaller than the others in order to provide a stop for the sharpened end of the wire so that it will not extend through the coil. This insures the covering of the sharpened end so that it is not apt to prick or scratch the user when applying the seal and also provides a neat appearance in the finished device.

I have shown preferred forms of my invention particularly adapted to kosher identification but changes may be made in the same without departing from the scope of the invention as set forth in the following claims.

I claim:

1. A seal formed of a single piece of wire having an integrally formed coil at one end for receiving the opposite end, the outer turns of the coil being enlarged to provide an enlarged opening and the inner turns of the coil being formed to prevent the end of the wire from passing through the same when inserted in the coil.

2. A seal comprising a single piece of wire sharpened at one end and having a substantially closed helical coil at the opposite end in which the sharpened end is positioned, said coil being flattened and providing substantially uninterrupted flat sides, said flattened sides being marked with identifying marks impressed therein.

3. A seal comprising a shackle formed of wire with an integrally formed closed coil at one end having an opening therein receiving the opposite end of the wire and of slightly larger diameter than the wire, the coil being flattened to form substantially continuous flat surfaces with its rings embedded in the end of the wire, and identifying marks in the flattened surfaces of the coil.

BRUCE BORLAND.